United States Patent
Hsiao et al.

(10) Patent No.: US 11,381,796 B2
(45) Date of Patent: Jul. 5, 2022

(54) IMAGE-SENSING DEVICE AND METHOD FOR AUTO WHITE BALANCE THEREFOR

(71) Applicant: REALTEK SEMICONDUCTOR CORP., Hsinchu (TW)

(72) Inventors: Ching-Ju Hsiao, Hsinchu (TW); Wen-Tsung Huang, Hsinchu (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 0 days.

(21) Appl. No.: 16/983,183

(22) Filed: Aug. 3, 2020

(65) Prior Publication Data
US 2021/0044785 A1  Feb. 11, 2021

(30) Foreign Application Priority Data
Aug. 7, 2019 (TW) ................. 108128119

(51) Int. Cl.
*H04N 9/73* (2006.01)
*H04N 5/33* (2006.01)
(Continued)

(52) U.S. Cl.
CPC ............. *H04N 9/73* (2013.01); *H04N 5/33* (2013.01); *H04N 5/332* (2013.01);
(Continued)

(58) Field of Classification Search
CPC ........ H04N 9/73; H04N 9/735; H04N 9/3182; H04N 5/33; H04N 5/332; H04N 5/04559; H04N 9/04553
See application file for complete search history.

(56) References Cited

U.S. PATENT DOCUMENTS

| | | | |
|---|---|---|---|
| 9,386,230 B1* | 7/2016 | Duran | H04N 5/232 |
| 2005/0174442 A1* | 8/2005 | Yuyama | H04N 9/735 |
| | | | 348/226.1 |

(Continued)

FOREIGN PATENT DOCUMENTS

| | | |
|---|---|---|
| CN | 104113743 A | 10/2014 |
| CN | 105872510 A | 8/2016 |

(Continued)

OTHER PUBLICATIONS

EPO, English-language machine translation of CN108600725 A (Year: 2021).*

(Continued)

*Primary Examiner* — David N Werner
(74) *Attorney, Agent, or Firm* — Li & Cai Intellectual Property (USA) Office

(57) ABSTRACT

Provided herein is an image-sensing device and a method for auto white balance. An image signal processor is used to perform the method. In the method, an RGBIr photo sensor receives an image with data over red, green and blue channels. The image data over the red, green and blue channel is firstly restored. A series of weights are calculated according to the image data over an infrared channel. The weights are allocated to the image data so as to adjust the infrared ratios over the red, green and blue channels for reducing infrared effect on auto white balance. After that, an infrared weighting calculation is performed for adjusting the infrared values over the red, green and blue channels of the image. A set of white balance gains are obtained. An auto white balance is performed for obtaining a new image with infrared crosstalk compensation.

2 Claims, 7 Drawing Sheets

(51) Int. Cl.
*H04N 9/07* (2006.01)
*H04N 9/04* (2006.01)
*H04N 9/31* (2006.01)

(52) U.S. Cl.
CPC ..... *H04N 9/04553* (2018.08); *H04N 9/04559* (2018.08); *H04N 9/07* (2013.01); *H04N 9/3182* (2013.01)

(56) References Cited

U.S. PATENT DOCUMENTS

| | | | | |
|---|---|---|---|---|
| 2005/0270383 | A1* | 12/2005 | Hung | H04N 9/735 348/225.1 |
| 2009/0079834 | A1* | 3/2009 | Otsu | H04N 5/332 348/169 |
| 2010/0039528 | A1* | 2/2010 | Ogasahara | H04N 9/735 348/E9.051 |
| 2013/0093929 | A1* | 4/2013 | Kouyama | H04N 9/04559 348/273 |
| 2013/0242131 | A1* | 9/2013 | Timm | H01L 31/02162 348/223.1 |
| 2014/0253705 | A1* | 9/2014 | Kummailil | H04N 9/73 348/68 |
| 2015/0168723 | A1* | 6/2015 | Eto | H04N 13/344 348/51 |
| 2015/0312541 | A1* | 10/2015 | Usui | H04N 9/735 348/164 |
| 2016/0205374 | A1* | 7/2016 | Olsen | H04N 5/3415 348/223.1 |
| 2016/0255290 | A1* | 9/2016 | Wajs | H04N 9/045 348/164 |
| 2017/0134704 | A1* | 5/2017 | Otsubo | G02B 5/208 |
| 2017/0366723 | A1* | 12/2017 | Kurata | H04N 5/2351 |
| 2018/0367744 | A1* | 12/2018 | Ozone | H04N 9/04553 |
| 2019/0110037 | A1* | 4/2019 | Lukac | H01L 27/14621 |
| 2020/0053333 | A1* | 2/2020 | Hu | H04N 5/243 |
| 2020/0228769 | A1* | 7/2020 | Yu | H04N 9/735 |
| 2020/0288072 | A1* | 9/2020 | Seok | H04N 5/2254 |

FOREIGN PATENT DOCUMENTS

| | | | | |
|---|---|---|---|---|
| CN | 108600725 | A * | 9/2018 | H04N 9/73 |
| CN | 108600725 | A | 9/2018 | |
| JP | 2014220758 | A * | 11/2014 | H04N 5/33 |
| WO | WO-2017109693 | A1 * | 6/2017 | C01G 9/02 |
| WO | WO-2017186071 | A1 * | 11/2017 | G06K 9/3233 |

OTHER PUBLICATIONS

China Patent Office, Office Action dated Jan. 30, 2022 for CN patent application No. 201910766131.3.

* cited by examiner

| 44 | 41 | 36 | 33 | 32 |
|---|---|---|---|---|
| 17 | 20 | 22 | 25 | 20 |
| 8 | 8 | 6 | 11 | 12 |
| 6 | 6 | 6 | 4 | 4 |
| 4 | 3 | 1 | 1 | 3 |

FIG. 7A

| 0 | 0 | 0 | 0 | 0 |
|---|---|---|---|---|
| 1 | 1 | 1 | 0 | 1 |
| 2 | 2 | 2 | 2 | 2 |
| 3 | 3 | 3 | 3 | 3 |
| 3 | 3 | 3 | 3 | 3 |

FIG. 7B

IMAGE-SENSING DEVICE AND METHOD FOR AUTO WHITE BALANCE THEREFOR

CROSS-REFERENCE TO RELATED PATENT APPLICATION

This application claims the benefit of priority to Taiwan Patent Application No. 108128119, filed on Aug. 7, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is generally related to an image sensor, and in particular to an image-sensing device with function of white balance and a method of auto white balance thereof.

BACKGROUND OF THE DISCLOSURE

A conventional image sensor with red, green and blue channels may further incorporate a color filter array including a channel capable of sensing near-infrared light, i.e., an RGBIr sensing component. Rather than the conventional RGB sensing component, the RGBIr sensing component can output a brighter image under a low light environment. Further, the RGBIr sensing component that is able to sense an IR image is also applicable for additional image-processing procedure such as face recognition and Bokeh rendering.

When processing a spectrum with the red, green, blue and near-infrared lights, these color channels may be overlapped. For example, the color of an object may be affected by IR crosstalk interference and induce color washout due to color shift phenomenon when the environment light consists of high infrared light component. Therefore, one of the important topics is to restore the true colors in an image signal processor with the RGBIr sensing component by incorporating an approach to IR crosstalk compensation in the image signal processor.

In the conventional technology of the IR crosstalk compensation, a certain proportion of infrared light signal value is deducted from the signal values of the red, green and blue channels. However, white balancing may fail to perform color correction accurately due to it being affected by the IR crosstalk compensation incorporated in the image signal processor.

Different from human eyes that can automatically adapt to the colors under different environmental color temperatures, the colors processed by an image-processing system would easily be affected by different environmental color temperatures without white balance processing. With a white color as an example, the white under outdoor sun may bias toward blue and the white under a low color-temperature bulb may bias toward yellow. That means that the white has a yellowish tinge. The digital signal processor should use a scheme of auto white balancing to compensate the white color under different color temperatures, in order to correct the overall colors.

A conventional white balance calculation includes a Gray World method and a Perfect Reflector method. The Gray World method assumes that three averages with respect to three components R, G and B of an image may approach a same gray scale. However, the white balance is easily affected by a single color if color of the image is too simple. The Perfect Reflector method assumes that the pixel of an image with largest brightness value is a white pixel that is referred to for image correction. Thus, the white balance is erroneous when the brightest pixel in the image is not white. Moreover, the white balance can also be erroneous as a result of it being easily affected by an ambient light or an infrared light.

SUMMARY OF THE DISCLOSURE

The present disclosure provides an image-sensing device and a method for auto white balance operated in the device. The method introduces a solution to solve the problem that the conventional automatic white balance (AWB) process may be affected by the infrared light component in an image to be processed. Specifically, the method for auto white balance of the disclosure can effectively eliminate the color shift occurring in the image due to the infrared crosstalk (IR crosstalk). Further, the method allows the image-sensing device to obtain an improved image after a subsequent auto white balance process.

According to one of the embodiments of the disclosure, the auto white balance method can be adapted to the image-sensing device including an RGBIr photo sensor with a color filter array that is capable of retrieving visible light and infrared light simultaneously. The image-sensing device includes an image signal processor used to perform the method for auto white balance of the disclosure.

In the method, the RGBIr photo sensor receives the image data of the red channel, the green channel, the blue channel and the infrared channel. The image is firstly restored to the original image data with the red, green, blue and infrared channels. The image data of the infrared channel of the image is referred to for generating weighting values used to adjust the image values of the channels of the image. After performing an infrared weighting allocation, the weighting value of the infrared light component of the image can be adjusted. An infrared weighting calculation is performed onto the values of the red channel, the green channel and the blue channel so as to obtain a white balance gain. This white balance gain takes the impact of the IR crosstalk into consideration. When the subsequent auto white balance with this white balance gain is performed, a new image with IR crosstalk compensation is outputted.

In an aspect, before the white balance calculation is performed, the image can be divided into multiple statistical windows according to hardware processing capability, in which, in every statistical window, the average values of the values responsive to the red, green, blue and infrared channels is regarded as the image data for each channel of the image.

Furthermore, in the step of performing infrared weighting calculation, an average value of the pixel values within every statistical window can be calculated. The image values with respect to the red channel, the green channel and the blue channel in the statistical window are calculated. An infrared weighting calculation is performed on the values of the red channel, the green channel and the blue channel. A white balance gain that includes a red-channel white balance gain, a green-channel white balance gain and a blue-channel white balance gain is obtained.

Still further, after obtaining the image data of the infrared channels in the image, in an aspect of the present disclosure, an average value of the values of the infrared channels is used as a global infrared light value. The infrared weighting can be allocated for each statistical window according to an infrared ratio table so as to perform the infrared weighting calculation on the values of the red channel, the green channel and the blue channel.

BRIEF DESCRIPTION OF THE DRAWINGS

The present disclosure will become more fully understood from the following detailed description and accompanying drawings.

FIG. 7A is a schematic diagram showing an infrared light content being counted in an image; and FIG. 7B is a schematic diagram showing weights being applied to windows.

DETAILED DESCRIPTION OF THE EXEMPLARY EMBODIMENTS

Figure 1:
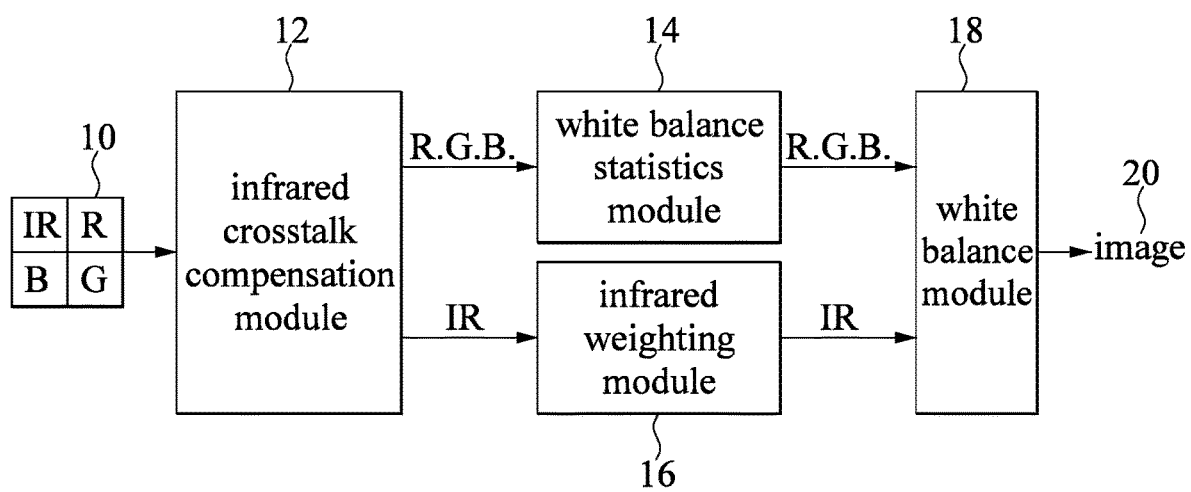
FIG. 1 is a schematic diagram depicting a system that retrieves white balance statistics information from an RGBIr photo sensor.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to an image-sensing device and a method for auto white balance operated in the image-sensing device. In the method, a digital image-processing technology is incorporated to correct colors in an image to reflect that perceived by the human eye in a real scene. The image-sensing device can be widely used in various products such as a digital camera, a smart phone, a laptop computer, a personal computer or an image surveillance system that includes a camera module, e.g., an image-sensing device, with a color filter array (CFA) for retrieving both the visible light (red, green and blue channels) and infrared light (infrared channel). The infrared light may be a near-infrared light with the wavelength larger than 700 nm.

The image-sensing device includes an RGBIr photo sensor that is with a color filter array for sensing the visible light and the infrared light/near-infrared light. Since the spectrum of the RGBIr photo sensor has overlapped spectral regions with the red, green, blue and infrared lights, the image may encounter color shift due to IR crosstalk phenomenon. In the meantime, the image may not be corrected accurately since the white balance is affected once the conventional infrared crosstalk compensation is applied to the image. The method for auto white balance of the disclosure adapted to the image-sensing device allows colors of the image rendered by the RGBIr photo sensor to be closer to colors of the real image seen by the human eyes.

The method for auto white balance being applied to the image-sensing device adopts a concept of gray-world algorithm that counts all the pixels of the image inputted to the image-sensing device for calculating a current gray value. The image can be divided into M*N windows according to the hardware capability. After that, an average value of the image values within every window is calculated. There are M*N statistical data to be obtained and used to calculate a white-balance gain in a color space. In one embodiment, for achieving an improved auto white balance, a color-temperature curve that denotes a distribution of the white colors respective to different color temperatures. An area covering the color-temperature curve can be defined as a white region. The statistical data falling in the white region will be used to calculate the white balance gain according to the present disclosure.

Reference is made to FIG. 1, which shows a schematic diagram of a system for performing a method for auto white balance to retrieve white balance statistical data through the RGBIr photo sensor according to one embodiment of the disclosure.

Several functional modules shown in the diagram of the system can be implemented by software and hardware, e.g., an image signal processor, for performing auto white balance. However, the algorithm and parameter adjustment of IR crosstalk compensation may suffer different levels of impacts on color restoration and the accuracy of statistical data since the white balance may be affected because the white balance statistical data is affected by the IR crosstalk compensation or the white balance statistical data affects the algorithm and the parameter adjustment.

Figure 2:
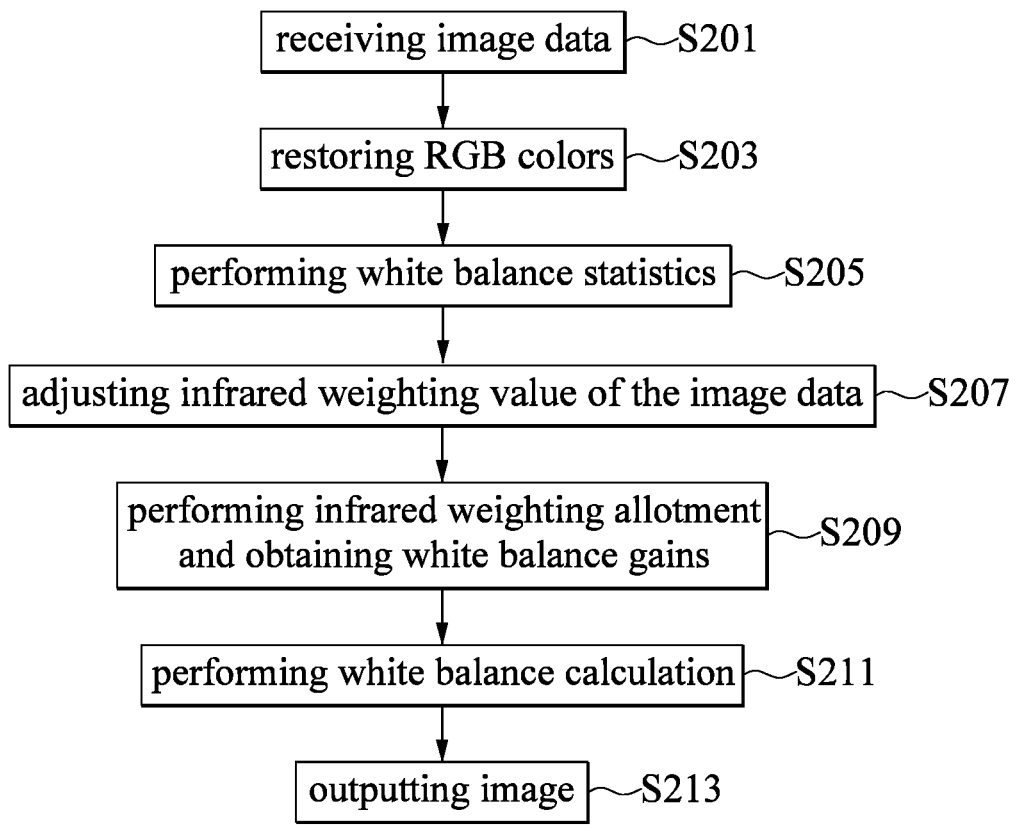
FIG. 2 shows a flow chart describing a method for auto white balance with IR crosstalk compensation according to one embodiment of the present disclosure.

To overcome the drawbacks, the method for auto white balance with IR crosstalk compensation of the disclosure is provided and can be referred to the exemplary steps described in FIG. 2.

On the premise that improper color shift should be prevented from the output image, the method for auto white balance of the disclosure is described as follows.

The method is generally performed by an image signal processor of the image-sensing device. The image-sensing device receives an image with the image data 10 of a red channel, a green channel, a blue channel and an infrared channel (step S201). The red, green and blue colors of the image data 10 in an RGB space can be restored (step S203). In the present example, after the colors of the red, green and blue channels of the image are restored, the image is then provided to a white balance statistics module 14 for conducting white balance statistics (step S205).

The input image is divided into M*N windows. In each window, an average value of the values of each of the red channel, the green channel, the blue channel and the infrared channel is calculated. The average value for each of the channels is regarded as the image data for each of the channels. The M*N statistical values are used to calculate a white balance gain for coordinates of a color space.

Next, a white balance statistics is performed on the image values of the red channel, the green channel and the blue channel so as to obtain a white balance statistical distribution of the image pixels. A white region (40, FIG. 4) is defined. When the white balance statistical value of the pixels falls in the white region, the pixel values within an ideal white region are the gray color in the real world. All the statistical values within the white region can be used to obtain a final white balance statistical value.

The image with high amount of infrared light in the real world is such as the sky and leaves. When the image is processed by an infrared crosstalk compensation module 12, a ratio among the values of the red channel, the green channel and the blue channel of the image may be changed according to the amount of effect caused by the IR crosstalk compensation. The locations of the statistical values may be shifted since the ratio among the values of the channel may be changed. The result of white balance calculation may be erroneous if the values of pixels fall in the white region (40, FIG. 4) due to the shift. Accordingly, the system shown in FIG. 2 provides an infrared weighting module 16 that can perform an infrared weighting allocation according the image data 10 of the infrared channel of every pixel of the image while performing auto white balance. Through the infrared weighting allocation, the ratio of the values of the infrared light in the red, green and blue channels in each statistical window can be adjusted and to reduce the effect of the infrared light.

Therefore, as shown in the procedures described in FIG. 2, the image data 10 of the infrared channel in the image can be processed by the infrared weighting module 16 for IR crosstalk compensation before substantially performing auto white balance. The infrared weighting module 16 can reduce the interference caused by the IR crosstalk. In step S207, the infrared weighting module 16 is incorporated to perform infrared weighting calculation so as to adjust the weighting value of the infrared light in the image data according to the infrared light content of the image pixels. Therefore, the impact to white balance caused by infrared light can be improved.

Further, in step S209, the infrared weighting allocation is performed according to the weighting values of infrared light in each window for recalculating sums respective to values of the red, green and blue channels in each statistical window by adjusting ratios/weights of infrared light in the red, green and blue channels. Accordingly, a set of white balance gains for the red channel, the green channel and the blue channel can be obtained. These white balance gains are provided for the white balance module 18 to perform white balance calculation (step S211), in which every pixel of the image is multiplied by a corresponding white balance gain. A correct image 20 with auto white balance is finally obtained (step S213).

In an exemplary example, the image value (or values of divided windows) with high infrared light content is allocated with relatively low infrared light weight. On the contrary, the image value (or values of divided windows) with relatively low infrared light content is allocated with relatively high infrared light weight. When the image is processed with white balance in accordance with the method for auto white balance of the disclosure, the effect caused by infrared light can be effectively reduced or eliminated. The final image 20 has been successfully processed with the IR crosstalk compensation.

Figure 3:
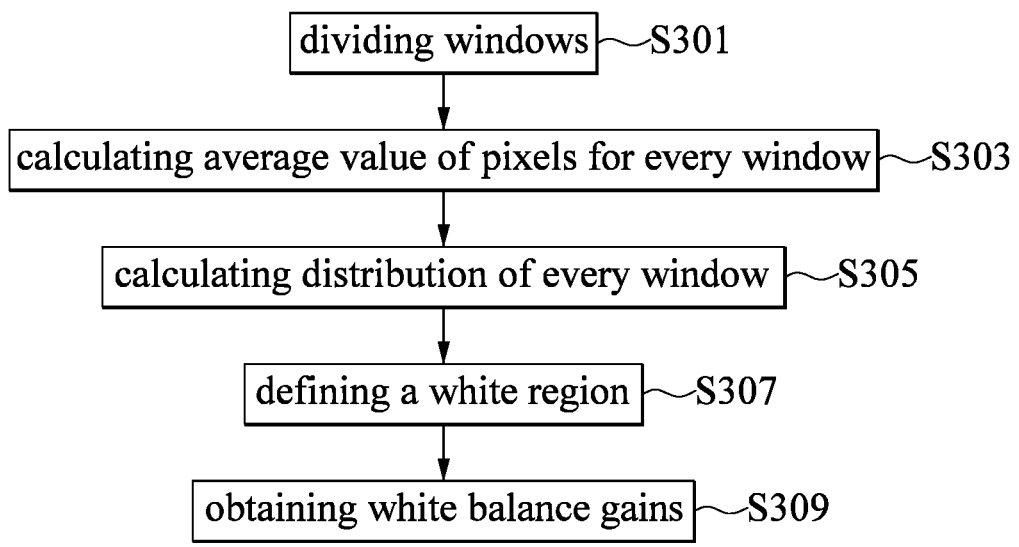
FIG. 3 shows a flow chart describing a process for performing white balance statistics according to one embodiment of the disclosure.
Figure 4:
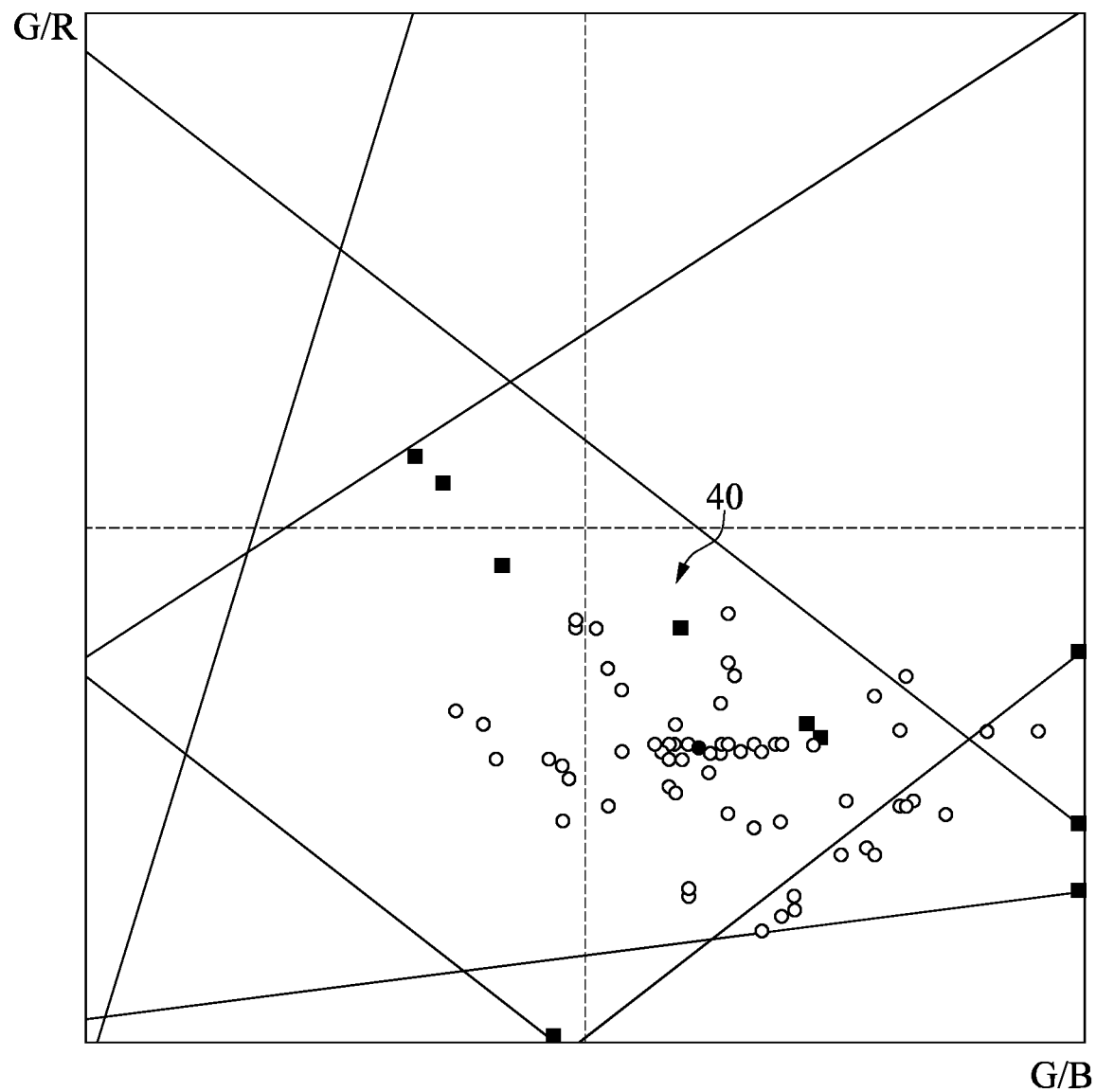
FIG. 4 is a schematic diagram showing a distribution of white balance statistical values and a white region in one embodiment of the disclosure.

In the step for obtaining the white balance gain according to white balance statistics, reference is made to FIG. 3 which shows a flow chart of white balance statistics and to FIG. 4 which is a schematic diagram depicting a distribution of white balance statistical values and a white region therein in one embodiment of the disclosure.

The white balance statistics module 14 is configured to divide an image in a specific color space into multiple windows. For example, the image with color information of red, green and blue channels in a RGB color space is divided into M*N windows (step S301). The number of windows to be divided is not limited to a specific value but depends on the hardware capability. An average value of pixel values within every statistical window can be calculated. Therefore, the image data of the red channel, the green channel and blue channel in each statistical window can be obtained and represented by $R_{mean}$, $G_{mean}$ and $B_{mean}$ respectively (step S303).

A predetermined color space is such as a Cb-Cr color space or G/R-G/B space. In the Cb-Cr color space, the Cb and Cr are the blue-difference and red-difference chroma components. In every divided window, a distribution of white color of image within the white region of the color space can be obtained (step S305). The coordinates of the distribution is referred to FIG. 4. The diagram shows a distribution of the white colors under different color temperatures, and a white region 40 covering the curve shown in the diagram is defined. The pixel data will be counted for calculating the white balance gain if a white balance statistical value of the pixel falls in this white region 40.

Further, a more ideal white region can be defined according to this distribution (step S307) for obtaining the image with better white balance. The values within the ideal white region can be a gray in a real world. All the statistical values within this white region can be finally used to obtain the white balance gain (step S309). In one of embodiment, the average value of all of the white balance statistical values is regarded as the white balance gain.

Figure 5:
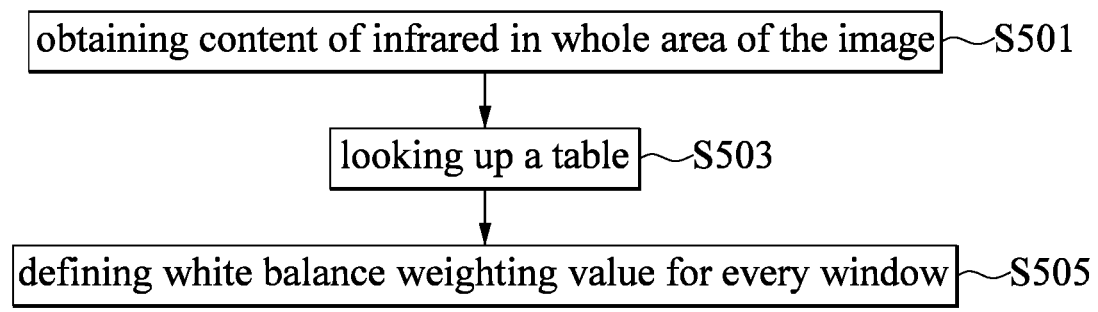
FIG. 5 shows a flow chart describing a method for infrared weighting allocation while performing auto white balance according to an infrared light content in one embodiment of the disclosure.

In the system for performing the auto white balance, the infrared weighting module (16, FIG. 1) performs an infrared weighting calculation (step S211 of FIG. 2). Reference is next made to FIG. 5, which describes a process for allocating weighting values according to the infrared light content in the image being applied to the method for auto white balance. The following description also refers to FIG. 6, FIG. 7A and FIG. 7B.

The infrared light content in the image data that is inputted to the system of the disclosure is firstly obtained. The values of infrared channel of the image can be obtained through an RGBIr photo sensor. A global infrared light content ($IR_{global}$) of the image is obtained (step S501). The system provides an infrared ratio table that regulates the ratios of infrared light content to weighting values compared to the global infrared light (step S503) for defining the white balance weighting values in each statistical window. The infrared ratio table is used to adjust the ratio of infrared light to the red, green and blue channels of the image in each statistical window in order to reduce the effect of infrared light to the subsequent auto white balance (step S505).

It should be noted that, in the process for obtaining the white balance weighting values, the weighting values can be calculated by referring to some parts of the image even if the average value of the values of infrared light in a whole image can be regarded as the global infrared value ($IR_{global}$). The parts of the image that refer to the calculation can be a central region of the image or any other portions of the image.

Figure 6:
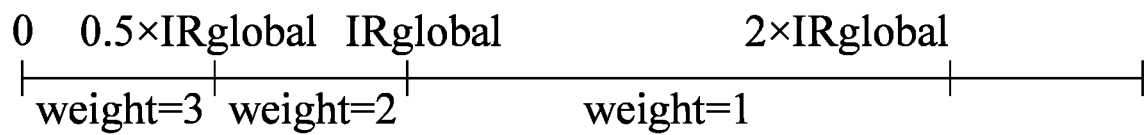
FIG. 6 is a schematic diagram showing an example of defining weighting values in one embodiment of the disclosure.

FIG. 6 is a schematic diagram of an example that is used to describe the ranges of various weighting values. The image inputted to the system is divided into multiple windows for purpose of statistical calculation. The example shown in FIG. 6 describes how the weighting values are allocated to the multiple statistical windows. The ratios shown in the figure are used to form the infrared ratio table. The global infrared value ($IR_{global}$) is used as a reference for infrared weighting allocation for each of the statistical windows. After that, the infrared weighting calculation is performed on the values of red, green and blue channels of the image.

In an exemplary example, if the infrared content in a statistical window is 0 to 0.5 times the global infrared value, the weighting value is 3 in a first region. The weighting value is 2 in a second region if the infrared content in another statistical window is 0.5 to 1 times the global infrared value. Further, the weighting value is 1 for the infrared content of the image is 1 to 2 times the global infrared content in one statistical window. Accordingly, the pixel values in a statistical window can be allocated with lower weight if the infrared light content thereof is higher than the global infrared content for reducing the effect of infrared light in the statistical window. Based on the global infrared content of each of the statistical windows, the weights are dynamically allocated to the statistical windows as the scene changes. Instead, the parameters of the image may not be changed as the scene changes.

FIG. 7A and FIG. 7B show two exemplary examples of images with different infrared contents and allocated with various weights in the different statistical windows.

In FIG. 7A, an image divided into 5*5 statistical windows with various infrared contents is shown. Based on requirement and hardware capability, the image is divided into the 5*5 statistical windows. The infrared content can be obtained through an RGBIr photo sensor of an image-sensing device. An average value of a specific statistical value of the values of pixels with infrared content in each statistical window is calculated. The infrared content (IR value) for each statistical window is obtained.

Next, in view of the relationship between the infrared content and the weights shown in FIG. 6 and the infrared ratio table created in FIG. 5, the weighting values allocated to the statistical windows of the image can be referred to FIG. 7B.

According to the above-described embodiments, the infrared weighting module 16 of FIG. 1 can be used to obtain the weighting values for each statistical window, such as in FIG. 7B. The infrared weighting allocation allows the system to reduce the effect to the white balance by the infrared light. The white balance module 18 then obtains a correct image 20. The implementation refers to the following process.

Firstly, statistical values of the pixels of an image falling in the white region are obtained. An infrared weighting allocation is performed. After adjusting the weights for the values of infrared channel in the image, the sums ($R_{total}$, $G_{total}$ and $B_{total}$) respective to the values of red, green and blue channels in each window are obtained by the equations 1, 2 and 3.

$$R_{total}=W11*R11_{mean}+W12*R12_{mean}+\ldots+W55*R55_{mean} \quad \text{(equation 1)}$$

$$G_{total}=W11*G11_{mean}+W12*G12_{mean}+\ldots+W55*G55_{mean} \quad \text{(equation 2)}$$

$$B_{total}=W11*B11_{mean}+W12*B12_{mean}+\ldots+W55*B55_{mean} \quad \text{(equation 3)}$$

Referring to FIG. 7B, such as in the equations 1, 2 and 3, the weighting values "W11, W12, W13, W14, W15, W21, . . . , W55" represent weighting values of 25 statistical windows; $R11_{mean}$ to $R55_{mean}$ denote average values of red channels in the statistical windows; $G11_{mean}$ to $G55_{mean}$ denote average values of green channels in the statistical windows; and $B11_{mean}$ to $B55_{mean}$ denote average values of blue channels in the statistical window.

When the sums or specific statistical values of the values of red, green and blue channels are calculated, a white balance gain for whole image can be obtained. The sum of values of green channels of a statistical window is used as a reference for calculating red and blue white balance gains respectively, such as the gains shown in equation 4 and equation 5.

$$R_{gain}=G_{total}/R_{total} \quad \text{(equation 4)}$$

$$B_{gain}=G_{total}/B_{total} \quad \text{(equation 5)}$$

After obtaining the white balance gain, each pixel value is multiplied by the white balance gain for achieving auto white balance.

Thus, in the image-sensing device, the method for auto white balance applied to the RGBIr photo sensor can effectively reduce the interference of IR crosstalk on the white balance statistics. From the algorithm of white balance, the effect of IR crosstalk upon the image restoration can also be reduced.

In conclusion, in the image-sensing device and the method for performing auto white balance according to the above-described embodiments of the disclosure, when the white-balance method is applied to an RGBIr photo sensor, the infrared content of the image causes interference that affects the correctness of color restoration. The method for auto white balance employs a mechanism of IR crosstalk compensation to eliminate the effect of IR crosstalk for obtaining the image with more accurate colors.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for auto white balance for an image-sensing device, comprising:
    receiving an image having image data of a red channel, a green channel, a blue channel and an infrared channel obtained by an RGBIr photo sensor, wherein the image is divided into multiple statistical windows, and an average value of values of each of the red channel, the green channel, the blue channel and the infrared channel is calculated and is used as the image data for each channel of each of the statistical windows;
    restoring the image data to colors in a red-green-blue color space;
    providing an infrared ratio table that regulates ratios of infrared light content to weighting values compared to a global infrared light value, wherein the average value calculated from values of the infrared channel is used as the global infrared light value;
    performing an infrared weighting allocation obtained from the infrared ratio table for each of the statistical windows so as to generate a plurality of weighting values for adjusting values of the red channel, the green channel and the blue channel of the image according to image information of the infrared channel, and to adjust a weighting value of the infrared light in the image information of the red channel, the green channel and the blue channel, so as to reduce impact caused by the infrared light to white balance;
    calculating a sum of the values of the green channel, and the sum is referred to as a green-channel white balance gain, and for calculating a red-channel white balance gain and a blue-channel white balance gain, wherein a white balance gain includes the red-channel white balance gain, the green-channel white balance gain and the blue-channel white balance gain for the image;
    obtaining the white balance gain when performing an infrared weighting calculation on the values of the red channel, the green channel and the blue channel of the image; and
    multiplying the values of the red channel, the green channel and the blue channel of each of pixels of the image by the red-channel white balance gain, the green-channel white balance gain and the blue-channel white balance gain respectively, and outputting a new image while the auto white balance is performed.

2. An image-sensing device, comprising:
    an RGBIr photo sensor with a color filter array that is capable of retrieving visible light and infrared light simultaneously; and
    an image signal processor configured to perform the steps including:
    receiving, by the RGBIr photo sensor, an image having image data of a red channel, a green channel, a blue channel and an infrared channel, wherein the image is divided into multiple statistical windows, and an average value of values of each of the red channel, the green channel, the blue channel and the infrared channel is calculated and is used as the image data for each channel of each of the statistical windows;
    restoring the image data of the image into color information in a red-green-blue color space;
    providing an infrared ratio table that regulates ratios of infrared light content to weighting values compared to a global infrared light value, wherein the average value calculated from values of the infrared channel is used as the global infrared light value;
    performing an infrared weighting allocation obtained from the infrared ratio table for each of the statistical windows so as to generate a plurality of weighting values for adjusting image values of the red channel, the green channel and the blue channel of the image according to image information of the infrared channel, and to adjust a weighting value of the infrared light in the image information of the red channel, the green channel and the blue channel, so as to reduce impact caused by the infrared light to white balance;
    calculating a sum of the values of the green channel, and the sum is referred to as a green-channel white balance gain, and for calculating a red-channel white balance gain and a blue-channel white balance gain, wherein a white balance gain includes the red-channel white balance gain, the green-channel white balance gain and the blue-channel white balance gain for the image;
    obtaining the white balance gain when performing an infrared weighting calculation on the values of the red channel, the green channel and the blue channel of the image; and
    multiplying the values of the red channel, the green channel and the blue channel of each of pixels of the image by the red-channel white balance gain, the green-channel white balance gain and the blue-channel white balance gain respectively, and outputting a new image while the auto white balance is performed.

* * * * *